(12) United States Patent
Camp et al.

(10) Patent No.: US 7,275,765 B2
(45) Date of Patent: Oct. 2, 2007

(54) VEHICLE STEERING ASSEMBLY

(75) Inventors: Eckart Op Den Camp, Koblenz (DE); Jiri Nevrkla, Dacice (CZ); Michael Appleyard, Solihull (GB)

(73) Assignees: TRW LucasVarity Electric Steering Limited (GB); Lucas Automotive GmbH (DE); TRW DAS A.S. (CZ)

( * ) Notice: Subject to any disclaimer, the term of this patent is extended or adjusted under 35 U.S.C. 154(b) by 289 days.

(21) Appl. No.: 10/831,691

(22) Filed: Apr. 23, 2004

(65) Prior Publication Data
US 2005/0029795 A1 Feb. 10, 2005

Related U.S. Application Data

(63) Continuation of application No. PCT/GB02/04805, filed on Oct. 23, 2002.

(30) Foreign Application Priority Data
Oct. 23, 2001 (GB) ................. 0125417.6
Jan. 29, 2002 (GB) ................. 0201979.2

(51) Int. Cl.
*B62D 1/00* (2006.01)
(52) U.S. Cl. ..................................... 280/777
(58) Field of Classification Search ........... 280/777, 280/775; 74/493; 464/140, 162
See application file for complete search history.

(56) References Cited

U.S. PATENT DOCUMENTS

| | | | |
|---|---|---|---|
| 3,791,233 A | 2/1974 | Bane | |
| 5,074,586 A | 12/1991 | Baskett | |
| 5,562,307 A | 10/1996 | Connor | |
| 5,988,679 A | 11/1999 | Schelling et al. | |
| 6,581,965 B2 * | 6/2003 | Lutz | 280/775 |
| 2006/0156856 A1 * | 7/2006 | Camp | 74/493 |

FOREIGN PATENT DOCUMENTS

| | | |
|---|---|---|
| EP | 0 341 078 | 11/1989 |
| EP | 0 470 888 | 2/1992 |
| EP | 0 836 981 | 4/1998 |
| EP | 0 440 403 | 8/2001 |
| FR | 2 809 368 | 11/2001 |
| GB | 2 295 219 | 5/1996 |
| JP | 8-295251 | 11/1996 |
| WO | 99/07592 | 2/1999 |
| WO | 03/035452 | 5/2003 |

\* cited by examiner

*Primary Examiner*—Faye M. Fleming
(74) *Attorney, Agent, or Firm*—MacMillan, Sobanski & Todd, LLC

(57) ABSTRACT

The assembly comprises: a hollow lower guide portion 7 a hollow upper shroud portion 10, which fits at least partially within the guide portion and extends away from the guide portion a telescopic steering shaft 1, 2 having at least an upper part 2 and a lower part 1, the upper part co-operating with the lower part and the two parts extending through the guide portion and the upper shroud portion a lower axial bearing 16, which is supported in a seat in the guide portion and provides axial location for the lower steering shaft part an upper axial bearing 17, which is supported in a seat in the upper shroud portion and provides axial location for the upper steering shaft part and in which the guide portion has at least one arcuate guide wall, which co-operates with a complimentary arcuate guide wall of the upper shroud to define a contact surface along which the upper shroud portion is adapted to slide relative to the guide portion in the event of an accident.

21 Claims, 13 Drawing Sheets

VEHICLE STEERING ASSEMBLY

CROSS REFERENCE TO RELATED APPLICATIONS

This application is a continuation of International Application No. PCT/GB02/04805 filed Oct. 23, 2002, the disclosures of which are incorporated herein by reference, and which claimed priority to Great Britain Patent Application No. 0125417.6 filed Oct. 23, 2001 and Great Britain Patent Application No. 0201979.2 filed Jan. 29, 2002, the disclosures of which are incorporated herein by reference.

BACKGROUND OF THE INVENTION

This invention relates to an improved steering assembly for a road vehicle such as a passenger car. It in particular relates to a steering assembly of the electric power assisted steering (EPAS) type.

EPAS assemblies include an electric motor, which acts through a gearbox and optionally a clutch to apply an assistance torque to a steering shaft of a vehicle. The driver turns the steering shaft by applying a torque to a steering wheel, which is transferred to the steering shaft. The assistance torque applied by the motor acts to help the driver to turn the steering wheel, reducing the effort required for steering the vehicle.

The steering shaft and the motor need accurately to be held in a fixed position relative to one another during normal operation of the vehicle. However, in the event of an accident involving a rapid deceleration of the vehicle it is desirable for the steering assembly to collapse allowing the steering wheel to move towards the front of the vehicle under the weight of the driver. This has in the past been achieved in many ways. In one arrangement the steering shaft is manufactured as a single component with weakenings along its length permitting it to collapse axially by a controlled deformation as a force is applied to the steering wheel. In an alternative, it is known to provide a two-part steering shaft in which one part slides axially over the other as a force is applied to the steering wheel.

As well as allowing the steering shaft to collapse it is essential to permit the shroud, which encloses and supports the shaft to collapse. An example of such an arrangement is taught in our earlier application No. GB 9716747.2 In the assembly described in that application the shroud is provided in two sections with one section sliding into the other. To locate the steering shaft the lower section (furthest from the steering wheel) has two annular bearings, which support the steering shaft at spaced locations.

In some applications, typically on higher specification vehicles, it is also desirable for the steering wheel to be adjustable both for rake and for reach. Reach adjustment requires axial movement of the steering wheel away from or towards the driver. Such a range of adjustment permits the driver to obtain a more comfortable driving position. This further complicates the design of the steering assembly.

In many cases there is often a very limited space within which the collapsible assembly can be located. At least part of this space may be taken up by the electric motor and its housing making the provision of adequate crash protection a more demanding challenge than on a more traditional non-assisted steering system.

SUMMARY OF THE INVENTION

In accordance with a first aspect of the invention we provide a steering assembly for a vehicle comprising:

a hollow lower guide portion;

a hollow upper shroud portion, which fits at least partially within the guide portion and extends away from the guide portion;

a telescopic steering shaft having at least an upper part and a lower part, the upper part co-operating with the lower part and the two parts extending through the guide portion and the upper shroud portion;

a lower axial bearing, which is supported in a seat in the guide portion and provides axial location for the lower steering shaft part;

an upper axial bearing, which is supported in a seat in the upper shroud portion and provides axial location for the upper steering shaft part; and further in which the guide portion has at least one arcuate guide wall, which co-operates with a complimentary arcuate guide wall of the upper shroud to define a contact surface along which the upper shroud portion is adapted to slide relative to the guide portion in the event of an accident.

We therefore provide a steering assembly, which permits an axial movement of a steering wheel in the event of an accident in a confined space and provides for the accurate alignment of the component parts of the assembly to be maintained.

By providing a guide wall of the upper shroud portion which directly co-operates with a guide wall of the guide portion the process of alignment of the upper shroud relative to the guide portion is simplified.

In a most convenient arrangement the guide wall of the guide portion defines at least one surface of constant radius (defining a segment of a first cylinder) whilst the guide wall of the upper shroud also defines at least one surface of constant radius (defining a segment of a second cylinder) with both walls having substantially the same radius. The axis of revolution of the guide walls preferably coincides with the axial centre of the upper and lower bearing seats and is aligned with the axis of the steering shaft. Thus, as the two walls are brought into contact it is assured that the bearing seats and hence the steering shaft are correctly aligned.

The wall of the guide portion may directly contact the wall of the upper shroud portion. In an alternative, a shim may be fitted between the two portions which is trapped between the walls. This may comprise a steel sheet. It may be glued or otherwise fixed onto the arcuate wall of the guide portions.

The arcuate walls provide an arc of contact between the two portions, which keeps them axially aligned as the two parts move relative to one another. In the event of an accident, one wall is adapted to slide over the other with the walls constricting the movement of the two portions.

The provision of arcuate walls is especially convenient as they are relatively simple to manufacture with a high degree of accuracy. By providing an arcuate wall on the guide portion, which co-operates with a wall on the upper shroud it is relatively simple to ensure that the two parts are concentric. This ensures that the upper and lower bearings can also be made concentric which further ensures that the steering shaft is correctly aligned with the motor housing.

The guide portion may comprise a cast metal or plastic or composite component. It is preferably cast in aluminium. The arcuate wall may be formed after casting by drilling a bore through the casting.

Where the arcuate walls are formed by drilling a bore through the guide portion the same tool can conveniently be used to form the seat for the lower bearing. This ensures that the arcuate walls and the bearing seat will be concentric and that the lower part of the steering shaft-supported by this bearing-is also concentric with the arcuate wall.

Thus, the wall of the guide portion and the lower bearing seat may be machined using a single tool during manufacture. Obviously, the provision of arcuate walls of constant radius is especially convenient. Nevertheless, the walls need not have a constant radius in order for the alignment benefits of the present invention to be achieved.

The bearing seat for the lower bearing may have a larger diameter than the arcuate walls allowing the walls to be formed by drilling completely through the guide and subsequently forming the seat. This considerably reduces the cost of producing the guide member. In this case, the arcuate walls will extend along the full length of the guide member before the bearing seat is formed.

The bore may be open at one side such that the guide portion comprises an elongate member having a generally c-shaped cross section along its length. A slot may be provided, for example by casting, in the internal wall of the guide portion opposite the open side of the cross-section. In this case, the guide portion will define two arcuate internal surfaces of equal radius and having a common axis, one section provided on each side of the slot. Both internal surfaces together define the arcuate wall of the guide portion and locate the upper shroud portion.

One or more pinch bolts may be provided which connect one open side of the c-shaped guide to the other, tightening of the bolt or bolts clamping together the sides of the guide onto pinch bolt posts provided around the bolts. This helps to strengthen the structure of the guide portion.

The upper shroud may comprise a cylindrical member or tube with the external radius of the tube being the same as (or slightly less than) the radius of the arcuate wall of the guide portion. The external wall of the tubular member may therefore define the arcuate wall of the upper shroud portion, which fits into the guide portion. It is most preferred that the upper shroud portion is a snug sliding fit within the bore in the guide portion. It may be desirable to machine the outer surface of the tube if low-grade tubing is used. The internal wall of the tube will provide the required seating for the upper bearing housing.

The upper bearing may be seated within the bore of the tubular upper shroud portion. This may be located as near as practically possible to the open, upper, end of the upper shroud portion. This ensures that the upper and lower bearings are as far apart as possible.

A further, intermediate bearing may be provided near to the lower end of the upper shroud portion.

In the event of an accident the upper shroud should be free to move into the guide portion. The two portions should therefore be supported by an alignment means which normally prevents relative axial movement of the two parts whilst permitting movement in the event of an accident. The amount of movement required, for example 65 mm, determines the minimum axial lengths of the guide surfaces of the upper shroud portion and the guide portion.

The alignment means may comprise one or more clamping bolts which force the two guide walls together to provide friction between them which is greater than the maximum axial force present in normal use but less than the force applied during an accident.

A spring may also be provided between the upper shroud and the upper part of the steering shaft acting via a bearing to support the upper part of the steering shaft relative to the lower part of the steering shaft.

An energy absorbing member may be provided which connects the upper shroud portion to the guide portion, the member deforming as the upper shroud is moved further into the guide portion in an accident. This may conveniently comprise a metal strip which passes around the or each pinch bolt and hooks over a lower end of the upper shroud. As the shroud moves into the guide portion the strip is bent which absorbs energy.

The width and or the thickness of the strip may vary along its length to control the rate of absorption of energy during collapse of the assembly.

This construction is particularly substantially for use with steering assemblies of the "single adjust" type which is only telescopically adjustable (Rake).

In a modification the energy absorbing member may comprise an inextensible member housed inside the guide portion and which is dragged around a pulley fitted to the pinch or clamp bolt.

Preferably the tethered end of the loop is hooked into a hole of a clamping panel, and the free end of the loop is formed into a second hook which during the initial stage of crash collapse, is dragged off a small anchor post.

In another construction the energy absorbing member comprises a loop of wire which is dragged around a flanged hub when the upper shroud is forced to telescope down in crash mode.

This construction may be utilised in steering assemblies of the "double adjustment" type which is telescopically adjustable (Rake) and tilt adjustable (Reach).

In such an assembly it is ideal to ensure that the same relationship exists between the collapse force (which is generated by forcing the wire around the hub) and the collapse distance, regardless of the initial position of "Reach" namely column length) adjustment at the time of the crash. To achieve this, the hub is made in the form of an elongated oval, the centre of which has a slot which allows it to move longitudinally relative to the clamp bottom during reach adjustment.

During a crash, the hub remains fixed relative to the column guide portion which is static in crash due to it having teeth along its inner edge which are engaged by teeth formed in the enlarged inner flange of the clamp bolt.

As with the steering assembly of the single-adjust type, one end of the wire loop is fixed to a post which is integral with the channel section which is welded to the upper column tube. Optionally, the other end of the loop is partially wrapped around a second post, also integral with the same channel so that it provides an additional collapse force during to first few millimeters of crash collapse. This is to resist the explosive reaction of the air bag deployment.

Optionally, to provide the column with the required longitudinal force resistance during normal driving, a small shear pin may be disposed between the flanged hub and the channel. By this means, the necessity is avoided for having a lash-free fit between the wire end attachments to the channel and the hub.

A leaf type spring may act between the head of the clamp bolt and the toothed flange hub to ensure that the reach-clamping teeth are disengaged fully when the clamp mechanism is released.

A small rubber moulding may also be inserted at each end of the slot in the flanged hub to provide "soft stops" which prevent a loud impact noise at the extremes of reach adjustment.

The lower part of the steering shaft may be slidingly engaged with a bore in the upper part of the steering shaft. One or more splines on the lower part (or upper part) may co-operate with one or more slots in the upper part (or lower part) to prevent relative rotation of the two parts.

A steering lock mechanism may be provided which in an unlocked position permits the upper part of the steering shaft to rotate relative to the upper shroud and in a locked position prevents relative rotation between the upper shroud and the upper part of the steering shaft.

Where a lock is provided the alignment means may be adapted to prevent rotation of the upper shroud portion relative to the guide portion. This resists any torque applied to the upper shroud by a thief levering against the steering wheel. As such, it should be able to resist a torque of at least 200 Nm or more.

The alignment means may therefore comprise a guide rail provided on the upper shroud portion which fits in a corresponding guide slot formed into the inside wall of the c-shaped guide opposite the open side of the guide portion. The clamping bolt may clamp the rail into the slot.

The assembly preferably comprises a part of an electric power assisted steering assembly. As such, the guide portion may include one or more mounting portions for securing the guide portion to a housing of an electric motor. The guide portion may be rigidly secured to the motor housing. It may, for example, be bolted or welded or otherwise secured to the motor housing.

An output shaft of the motor may co-operate with a lower end of the lower steering shaft part, which extends from the guide portion into the motor housing. The housing may also accommodate a torque sensor which measures the torque carried by the steering shaft and produces an output signal indicative of torque which is used to at least partially determine the amount of torque applied to the shaft by the motor.

It is possible to rigidly bolt the guide portion to the motor housing because the accuracy of the alignment of the upper and lower bearings, the guide walls and the mating surface is relatively high.

Because the guide is rigidly secured to the motor housing a simple bracket may be provided which supports the guide portion to the vehicle and permits adjustment of the rake of the assembly. The bracket may be a pressed steel component.

In accordance with a second aspect of the invention we provide a method of manufacture of a steering assembly for a vehicle having a telescopic housing for a steering shaft comprising a lower guide portion and an upper shroud portion which slides into the guide portion along complimentary surfaces provided on the guide portion and the shroud portion, the method comprising the steps of:

machining the guide surface into the guide portion and a bearing seat, which locates a lower end of the steering shaft within the guide portion using a single tool.

Machining the seat and the guide surface using a single tool ensures accurate alignment of the wall and the seat. The tool may comprise a drill which machines a bore through the guide portion to produce the wall, and subsequently machines the seat into the wall of the bore.

The method may comprise casting a blank of the guide portion, for example from aluminium, and subsequently machining the guide surface and the seat into the blank. Both the guide surface and the bearing seat may comprise arcuate walls of constant radius and a common axis of revolution. The bearing surface may comprise a complete cylindrical wall whilst the guide surface may define a segment, or at least two angularly spaced segments of a cylinder.

The method may further comprise using the same tool to machine one or more locating regions into an end face of the guide portion for contact with a housing for an electric motor. The end face may be machined perpendicular to the axis of the bearing seat using the single tool. This again helps to ensure correct alignment of the components of the assembly.

The method may be used to produce a steering assembly in accordance with the first aspect of the invention.

Other advantages of this invention will become apparent to those skilled in the art from the following detailed description of the preferred embodiment, when read in light of the accompanying drawings.

DETAILED DESCRIPTION OF THE INVENTION

Figure 3:
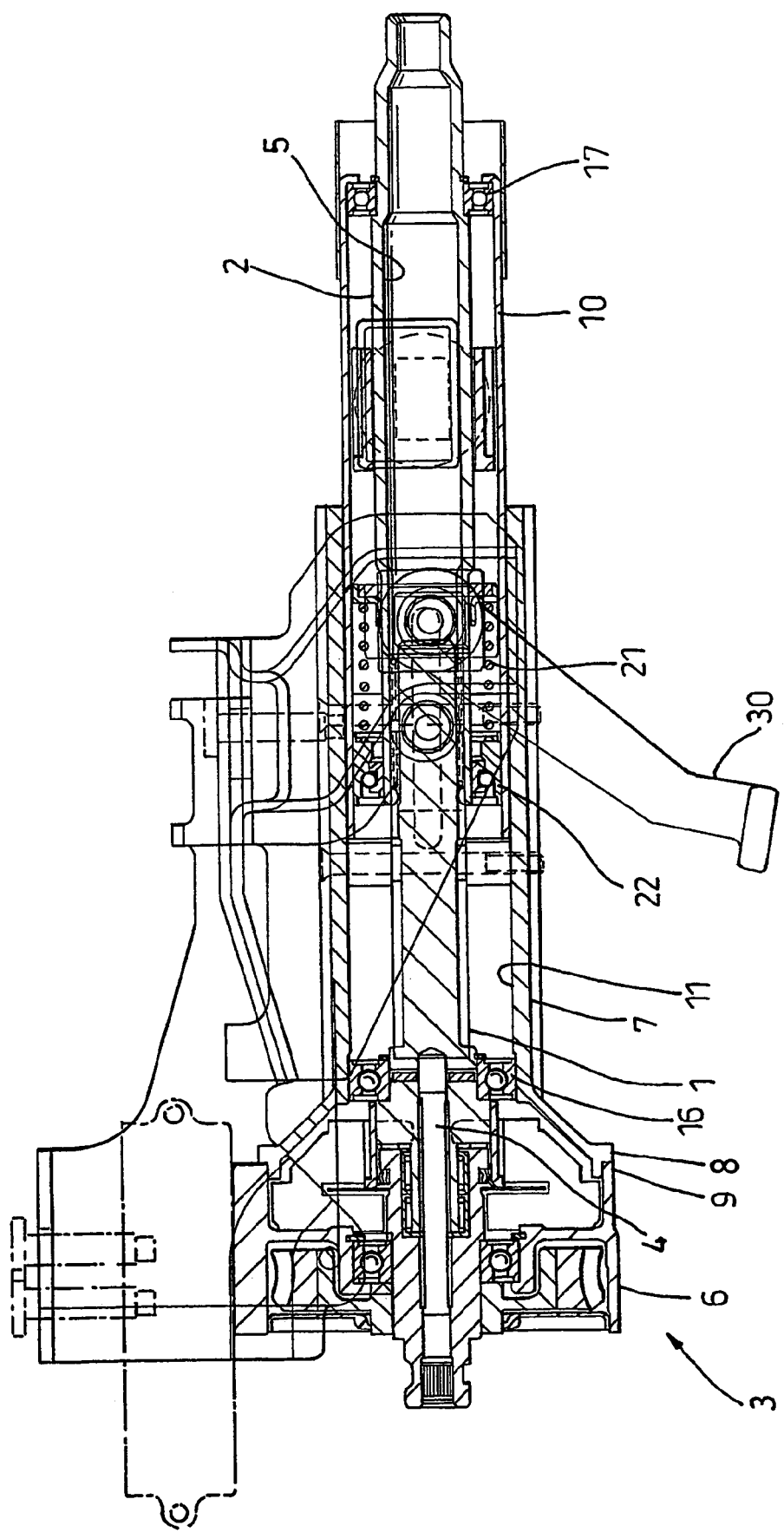
FIG. 3 is an elevational view in cross section of the steering assembly of FIG. 1.

The assembly comprises a two-part steering shaft 1,2, which interconnects a steering wheel (not shown) with an electric motor 4 (shown in FIG. 3 only). The motor 3 outputs a torque through an output shaft to a lower end of a first, lower, part 1 of the steering shaft. The second, upper part 2, of the steering shaft is secured at its upper end to the steering wheel. The second part 2 of the steering shaft has an internal bore 5, which slidingly accommodates an upper end of the lower part 1 of the steering shaft. Splines on the two parts prevent them from rotating relative to one another.

The motor 3 is located within a cast metal housing 6. An elongate guide portion 7 is secured by bolts (not shown) to the housing. The guide portion is cast from aluminium and has an annular mating face 8 on one end which mates with a complementary annular seat 9 on the housing 6. The guide portion defines a lower shroud for the steering shaft, which extends through the centre of the guide portion 7 for rotation there within. The guide portion 7 extends away from the motor housing 6 past the point where the two parts of the steering shaft interengage but stops short of the upper end of the steering shaft. The remainder of the steering shaft is covered by a hollow tubular upper shroud 10, which is slidingly engaged within the guide portion 7 around the steering shaft 1,2.

Figure 4:
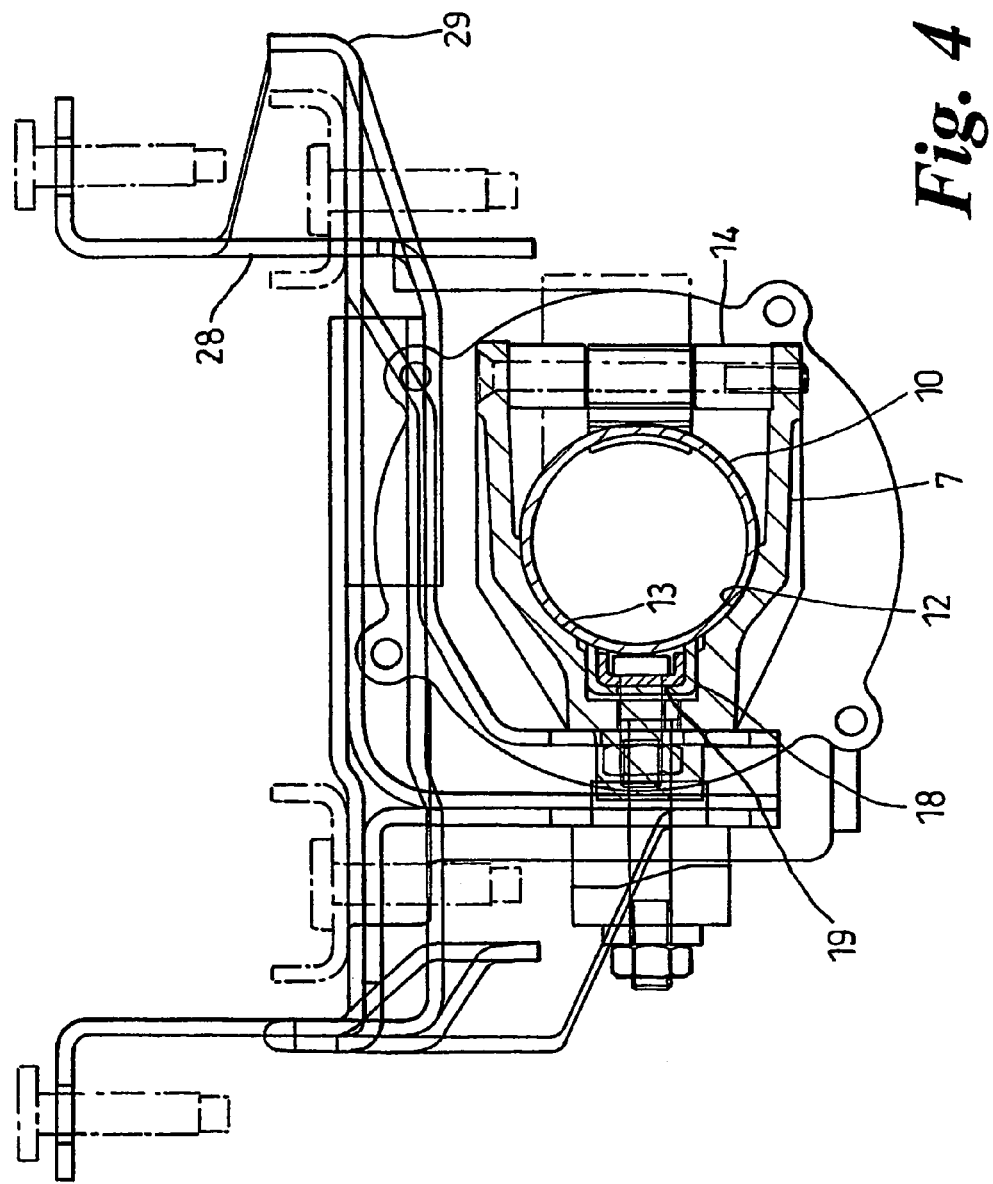
FIG. 4 is an end view in cross-section of the steering assembly of FIG. 1.
Figure 5:
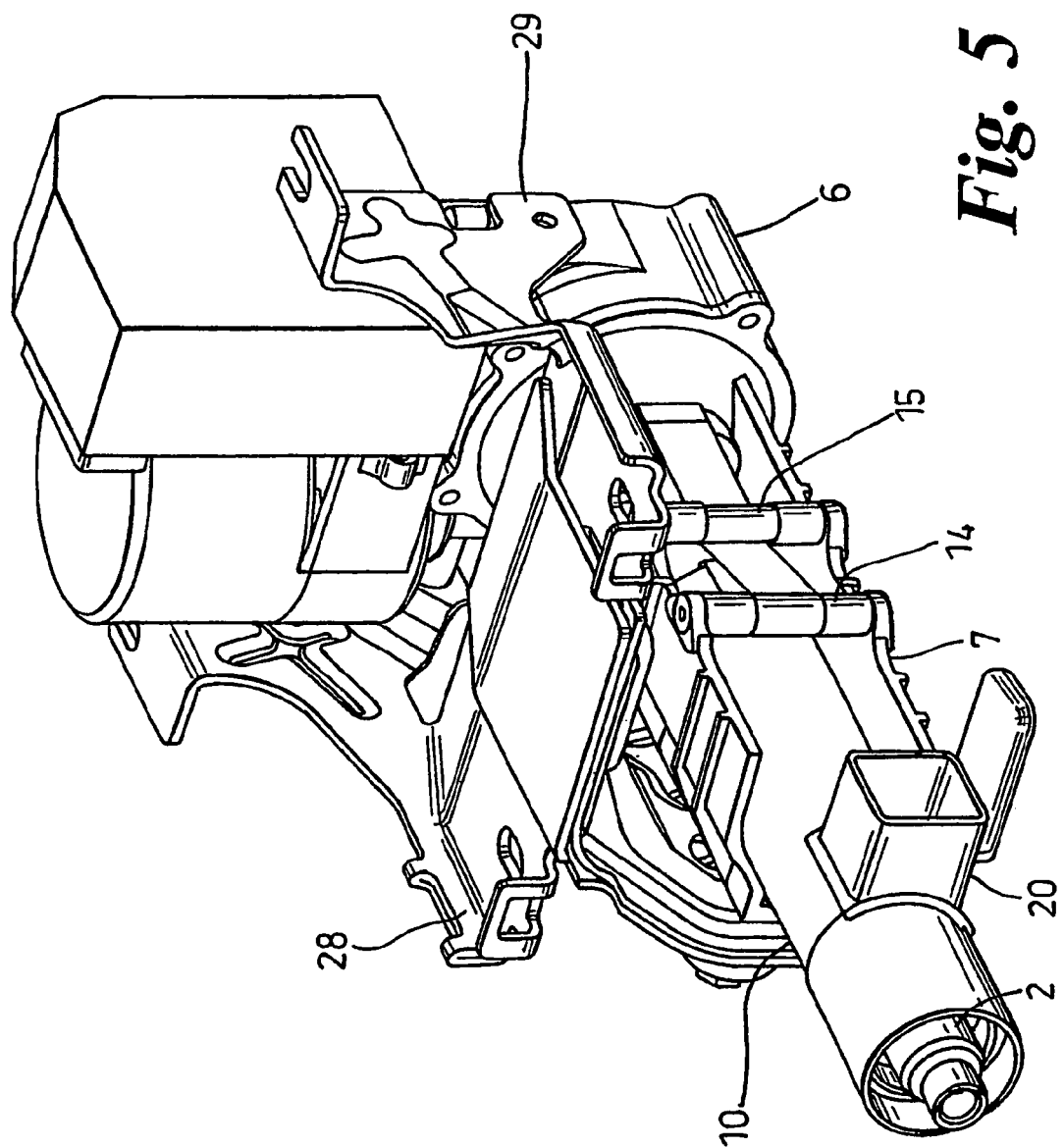
FIG. 5 is a complete isometric view of the steering assembly of FIG. 1.

The elongate guide portion 7 has a generally c-shaped cross section along most of its length with the inside wall 11 of the guide portion 7 being at least partially defined by a continuous annular through bore. The bore defines two arcuate wall sections 12,13, which co-operate with corresponding arcuate wall sections of the outer wall of the upper steering column shroud. The arcuate sections 12,13 where the guide portion 7 engages the upper shroud 10 provide location and guidance for the upper shroud. This can be seen most clearly in FIG. 4 of the accompanying drawings.

A pair of pinch bolts 14,15 passes through openings at either side of the open side of the guide portion 7 to close and strengthen the open side of the c-shaped guide portion 7. Tightening the bolts 14,15 closes the c-section slightly to cause the guide portion 7 to close slightly around the upper shroud 10.

The guide portion 7 defines a seat for a lower annular bearing 16 which supports the lower part 1 of the steering shaft at a point where it enters the motor housing 6. The upper shroud 10 also supports an upper annular bearing 17 located inside its bore, which supports the upper part 2 of the steering shaft. An intermediate bearing 22 may also be provided inside the lower end of the upper shroud. The upper bearing 17, the intermediate bearing and the lower bearing 16 therefore provide a complete location for the steering shaft. The inner diameter of the through bore in the guide portion is of smaller diameter than the diameter of the lower bearing seat.

Figure 1:
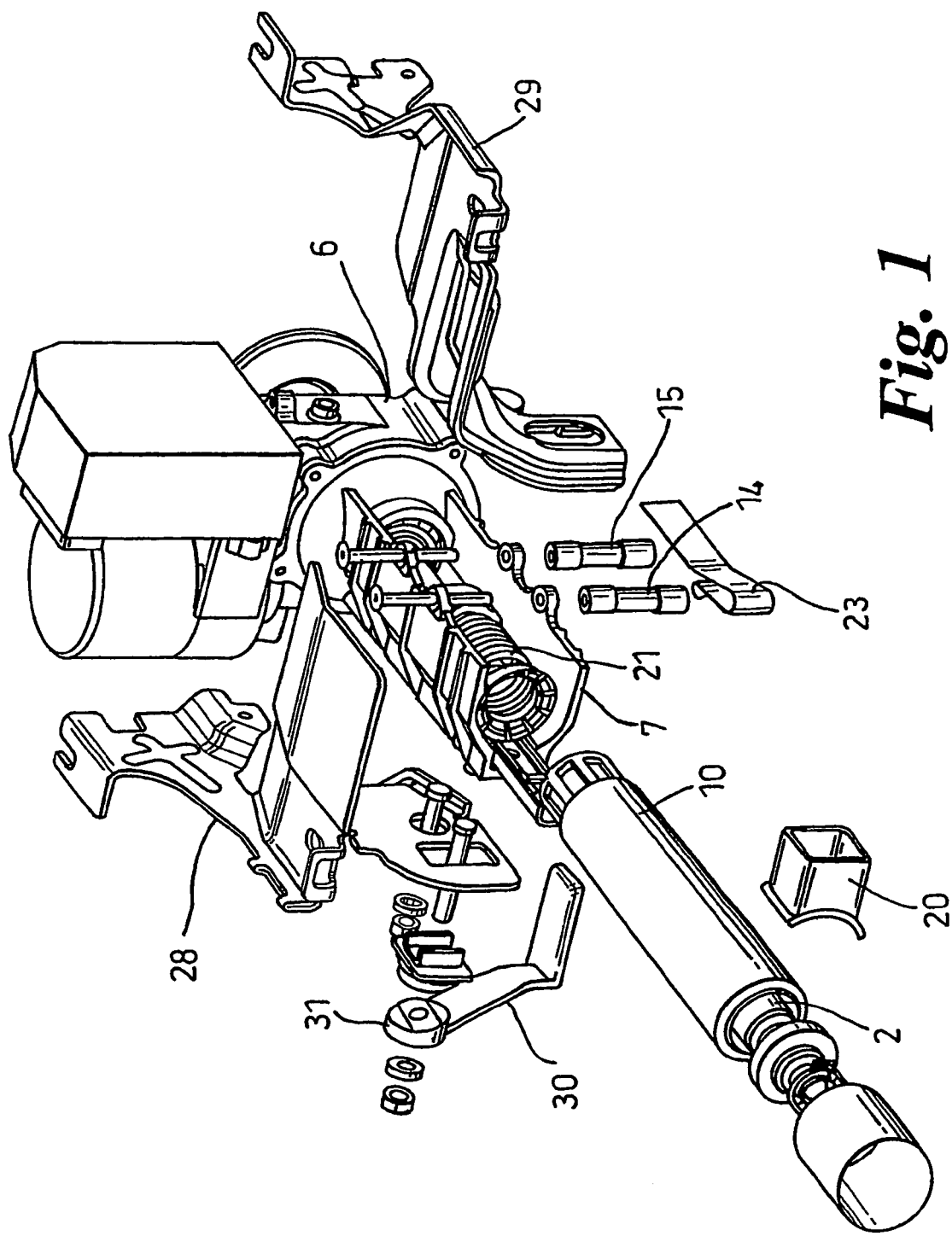
FIG. 1 is an exploded view of a steering assembly in accordance with a first embodiment of the invention.
Figure 2:
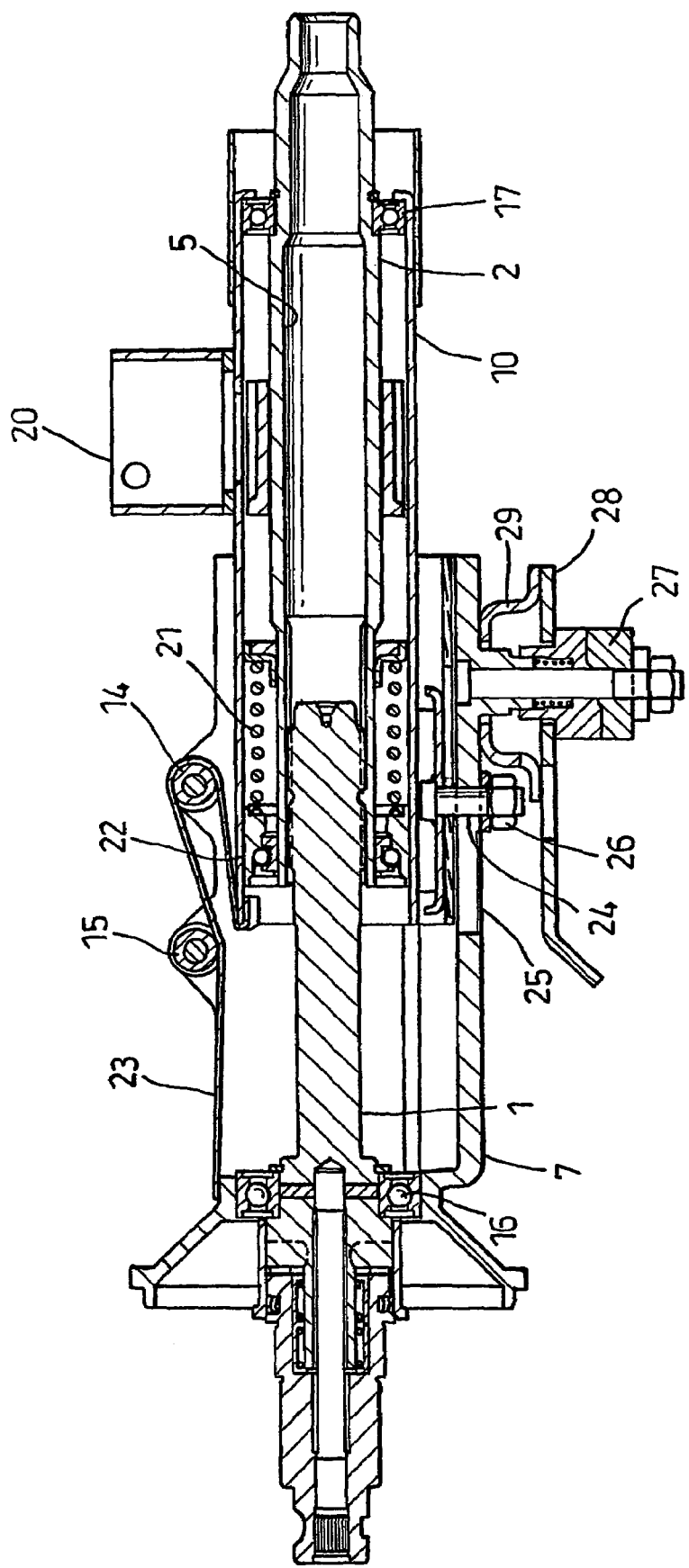
FIG. 2 is a plan view in cross section of the steering assembly of FIG. 1.

A groove 18 is cast in the inside wall of the guide portion 7. This groove extends axially along the guide portion 7 opposite the open side of the c-shaped cross section, and separates the two arcuate guide surfaces 12,13. A locating rail 19 is laser welded to one side of the upper shroud 10 and is located within the groove 18 in the guide portion 7. The location of this rail 19 in the groove 18 ensures that the upper shroud 10 will resist any torsional forces, which may be applied to the upper shroud. These forces typically occur if a thief tries to break a steering column lock (shown as a block 20 in FIGS. 1 and 2) provided between the shroud 10 and the steering shaft by levering on the steering wheel.

In normal use the guide portion 7 holds the upper shroud 10 in a fixed axial position. The upper bearing 17 and the lower bearing 16 provide axial locations for the two part steering shaft 1,2, and the housing 6 supports the motor relative to the steering shaft. The upper shroud 10 is fixed in place axially by frictional engagement between the arcuate guide and the shroud. A coil spring 21 is located within the upper shroud 10 and acts between a lower end of the shroud 10 and a collar 22 welded to the upper part 2 (or in an alternative welded to the inside of the upper shroud 10) of the two-part steering shaft. The spring 21 prevents the upper part 2 of the steering shaft collapsing onto the lower part 1 of the steering shaft.

Because the upper shroud 10 is held in place by frictional contact between its outer wall and the arcuate sections 12,13 of the inside of the guide portion 7, all the parts are aligned concentrically with a high degree of accuracy. This is further assured by machining the inner through bore of the guide portion 7 (to form the walls 12,13) and the seat for the lower bearing 16 using a single tool to ensure concentricity. The outer wall of the upper shroud 10 may also be machined if desired in a separate operation.

In the event of an accident, which causes a driver to apply a high axial load to the steering wheel, the upper shroud 10 can move axially into the guide portion 7 by sliding along the arcuate guide faces 12,13. At the same time, the steering shaft 1,2 can collapse axially with the lower part 1 of the steering shaft sliding into the upper part 2.

The relative movement between the upper shroud 10 and the guide portion 7 is controlled by providing an energy absorbing element 23 which is deformed in a controlled manner as the assembly collapses. This deformation absorbs energy to provide an optimal rate of collapse and control of the energy applied through the steering wheel.

The energy-absorbing element 23 comprises a metallic strip 23, which is wrapped around the two pinch bolts 14,15 and hooked around the lower end of the upper shroud portion 10. As the upper shroud portion 10 moves down into the guide portion 7 the strip 23 unwinds around the posts. The amount of energy absorbed can be tuned by appropriate selection of the gauge of the strip and its width. One or both may vary along the length of the strip 23.

Energy absorption is also provided by providing a friction bolt 24, which passes through the rail 19 and an elongate opening 25 in the bottom of the axial slot 18 in the guide portion 7. The bolt 24 is tightened by a nut 26 on one end to draw the rail into the slot and so increase the friction between the arcuate walls of the guide portion and the upper shroud. As the upper shroud 10 starts to move into the guide portion 7 the bolt 24 moves axially along the slot 25 and the friction between the arcuate walls and the shroud 10 must be overcome. After a predetermined distance of collapse, for example 16 mm, the friction adjustment bolt 24 slides into an area of the slot which is of reduced thickness so that the bolt 24 becomes slack. From this point on, the energy absorption provided by the metal strip will dominate. Of course, the elongate slot must be long enough to allow for sufficient movement of the shroud portion 10.

In this embodiment, a first slot 25*a* is provided in the guide portion and a second slot 25*b* is provided in the upper shroud. This allows the first and second slots to be half or long as a single slot provided in the guide rail or the upper shroud whilst permitting the same amount of axial movement.

To permit the rake of the steering column assembly to be adjusted the guide portion 7 is secured by a lateral clamp bolt 27 to two pressed steel brackets 28,29 which are welded together and secured to the vehicle body. Both brackets have elongate slots which coincide and the clamp bolt passes through bolt slots. The guide portion can be moved when the bolt is loosened, allowing the position of the assembly to be adjusted. When the bolt is tightened the assembly is fixed. One end of the bolt 27 covers a cam 32 which is of larger diameter than the slots. The other covers a handle 30 which operates a moving cam 31.

In a refinement, a thin cover sheet of shim steel can be provided between the guide portion 7 and the upper shroud 10. This is fixed onto the contours of the arcuate walls. If such a shim is provided, the radius of the walls of the guide portion must be greater than that of the outer radius of the tubular upper shroud by an amount at least equal to the thickness of the shim. The shim may be steel whilst the guide portion is made of aluminium. Such a shim is advantageous as it allows a steel-steel contact between the guide portion and the upper shroud which reduces wear during the life of the assembly. It is envisaged that this would be especially useful where the upper shroud can be moved in use to permit reach adjustment of the steering wheel.

Figure 6:
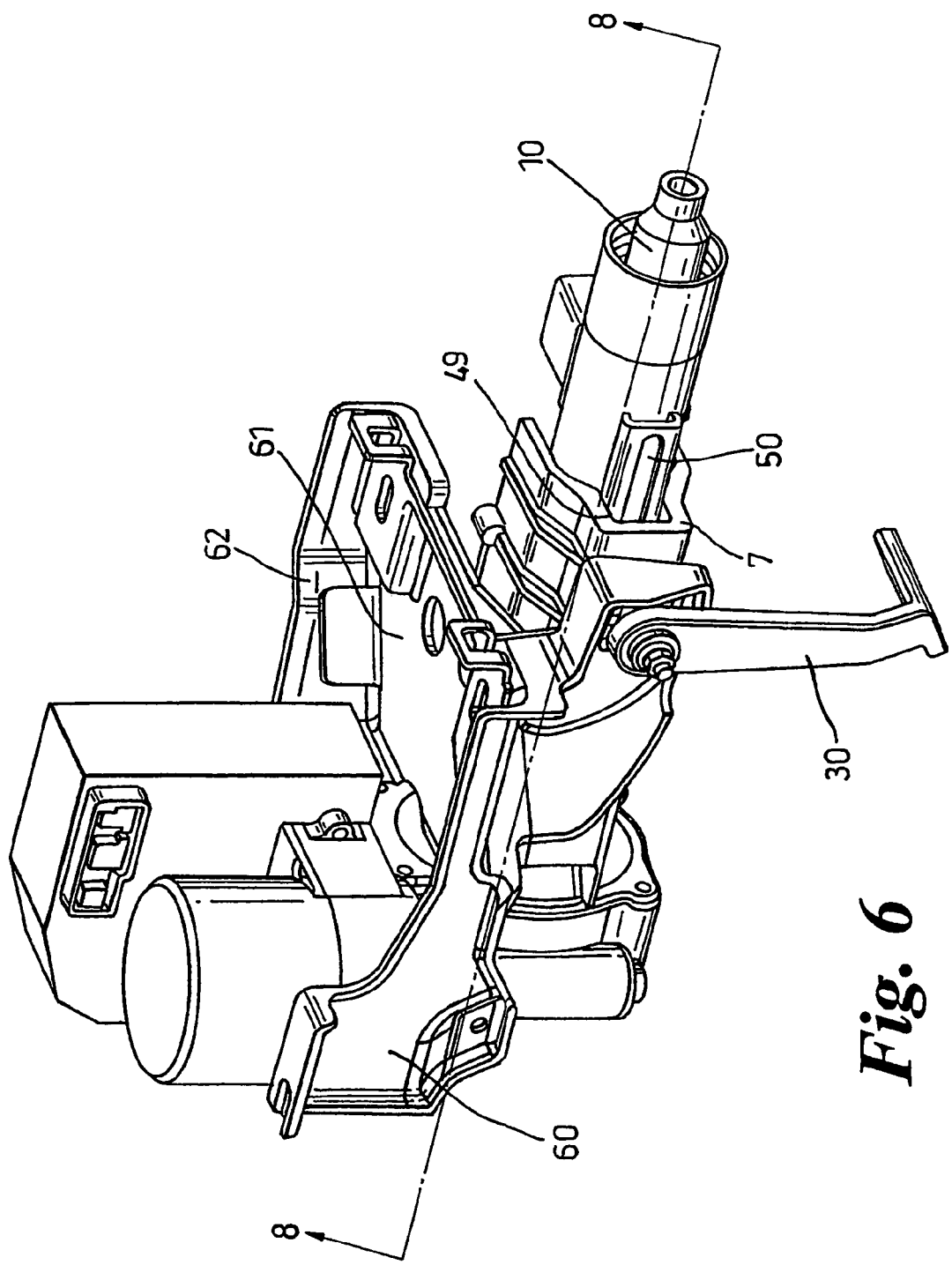
FIG. 6 is a perspective view in one plane of a second embodiment of the invention.
Figure 7:
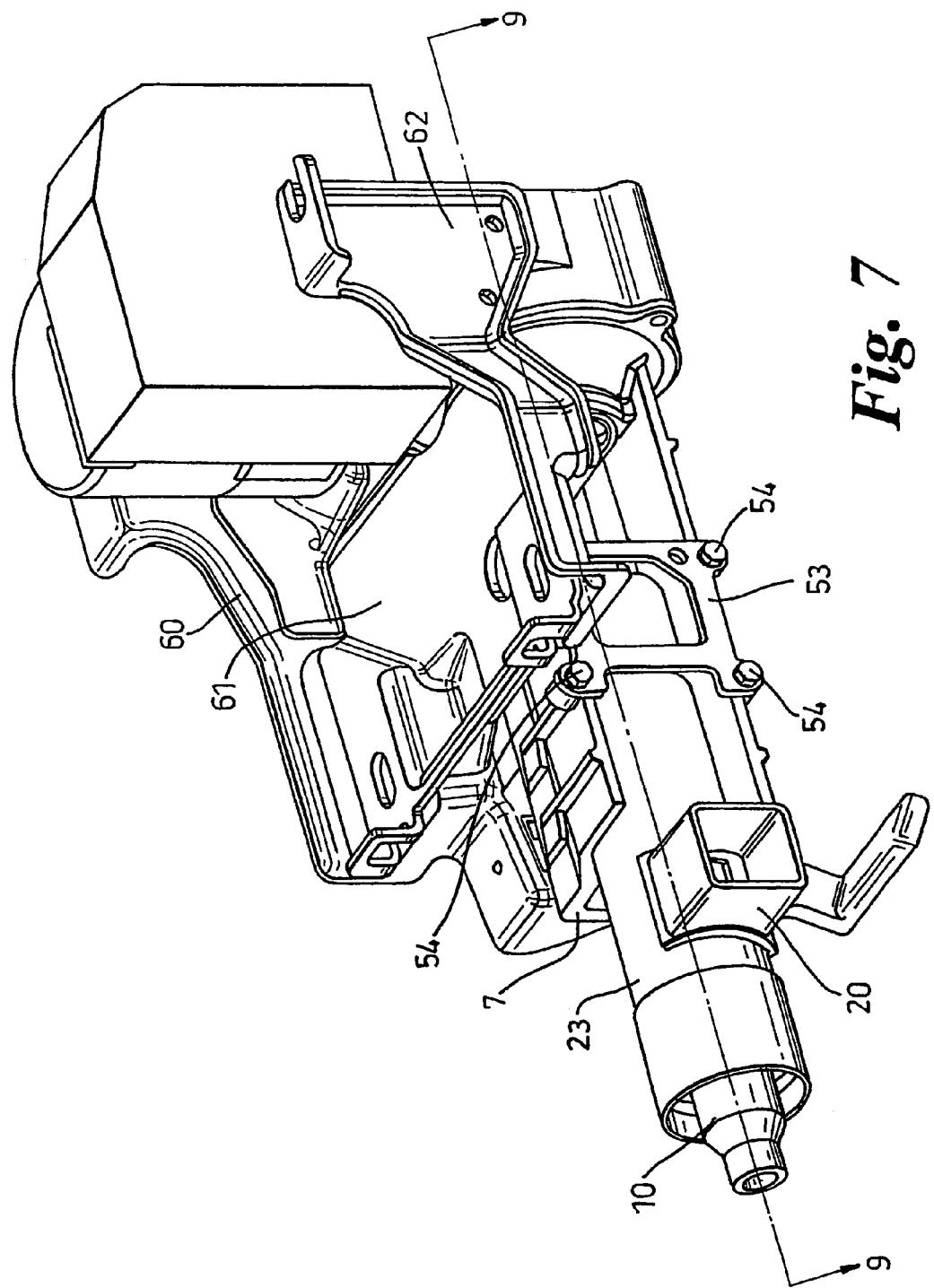
FIG. 7 is a perspective view in an opposite plane of the embodiment of FIG. 6.
Figure 8:
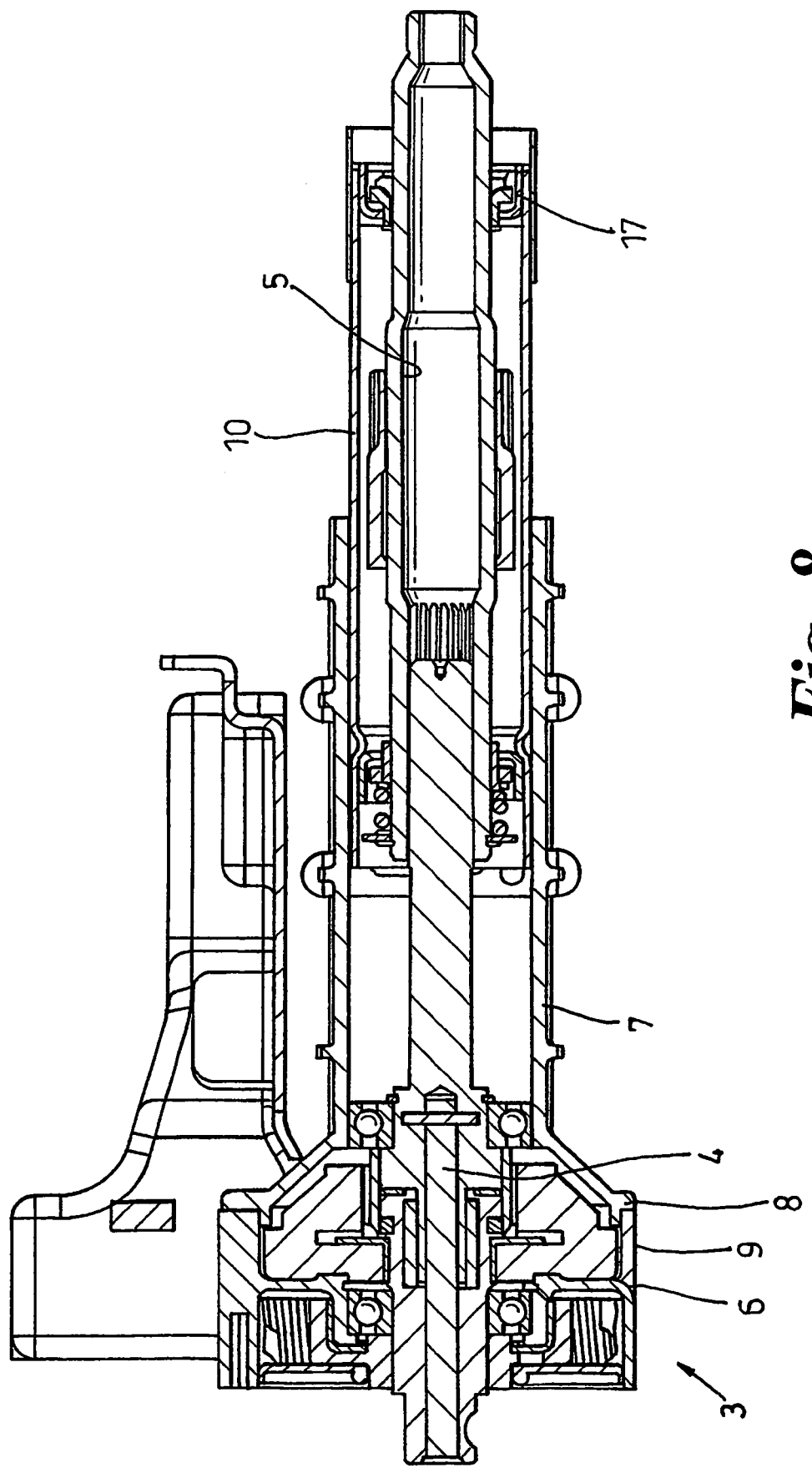
FIG. 8 is a longitudinal section on the line 8-8 of FIG. 6.
Figure 9:
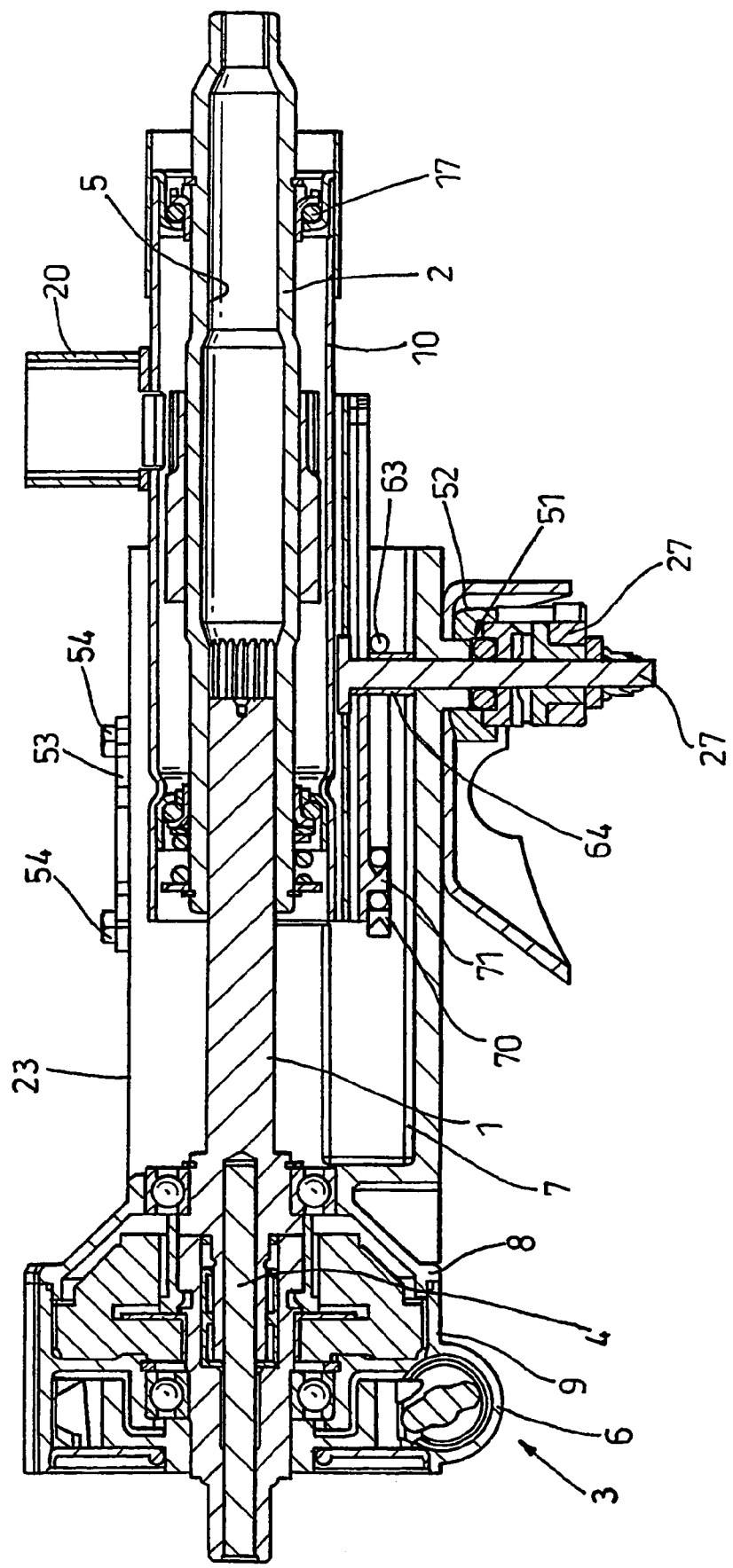
FIG. 9 is a longitudinal section on the line 9-9 of FIG. 7 substantially normal to the section of FIG. 8.
Figure 10:
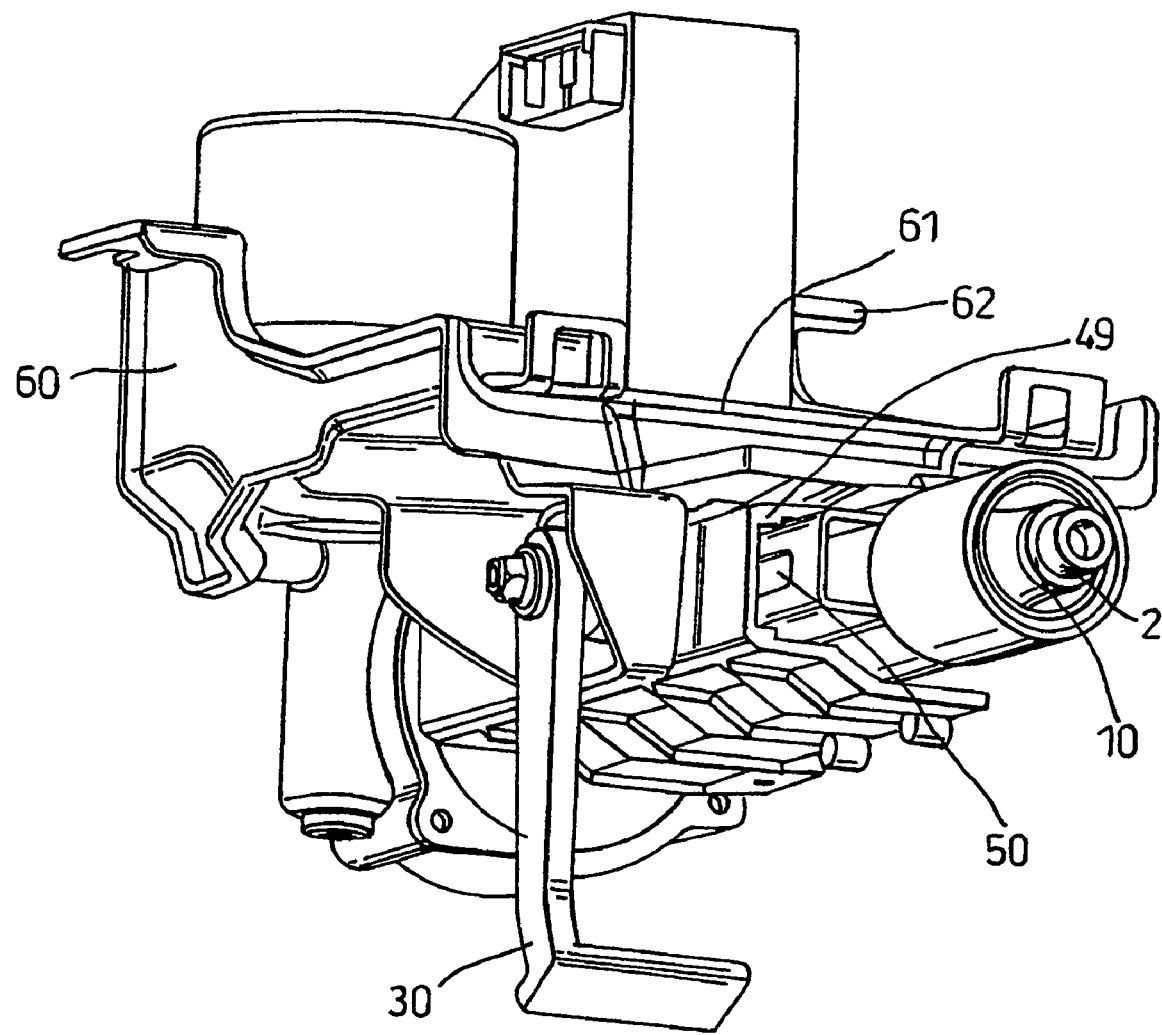
FIG. 10 is perspective view of the third embodiment of the invention.

In the embodiment illustrated in FIGS. 6 to 8 of the accompanying drawings the inner end of the clamp bolt 27 now acts on the guide portion 7 through a laser welded on clamping rail 50 rather than directly on the housing 6 (see FIG. 9). The clamping rail 50 is slidably guided in sliding faces 49 in the guide portion 7 which provide accurate alignment relative to the motor 3. This is proposed so that the control of the lateral pre-load remaining between the guide portions 7 and the housing 6, when the height adjustment is unclamped, can be incorporated into the main clamp bolt 5. Before, this required a separate adjusting nut position alongside the clamped spindle. This change provides an overall cost reduction. FIG. 9 of the accompanying drawings shows that the setting of the pre-load is obtained by pushing an "star" type washer 51, having internal teeth for gripping uni-directionally onto shafts, onto the clamp bolt 27 until it abuts a boss 52 on the guide portion 7 with a predetermined force.

Two vertical "pinch" tubes 14, 15 on the right of the column axis previously resisted opening of the C-section guide plates 7 when bending moments were applied to the assembly. These are shown in FIG. 7 as being replaced by a guide post stiffener plate 53 which is held in position by four screws 54. This represents a cost reduction. The plate 53 also provides a lower anchorage point for the rake adjustment counter balancing spring (not shown) which attaches at its upper end to the main bracket.

The main column bracket which was assembled by welding together two pressings 28, 29 in the previous embodiment, is now shown as being assembled from three pressings 60, 61 and 62. This enables simpler pressed shapes to be used, thereby reducing the overall tooling costs. The brackets 60 and 62 pivot directly on the gearbox of the vehicle.

In the earlier embodiment of FIGS. 1 to 5, the absorption of energy during crash collapse was achieved by forcing a strip of steel 23 to be dragged around the aforementioned pinch tubes 14, 15. In the embodiment of FIGS. 6 to 9, this is achieved by forcing and inexentensible flexible member comprising a loop 63 of 5 mm diameter wire, housed inside the guide portion 7, to be dragged around a pulley 64 in the form of a bush fitted to the clamp bolt 27. The tethered end of the loop is hooked into a hole 70 near the lower end, i.e. the end furthest from the steering wheel, of the clamping rail 50. This causes the wire 63 to be pulled over the pulley bush 64 as the upper column tube/clamping rail assembly travels down the housing 6 in a crash. The free end of the loop, adjacent to the tethered end, is formed into a second hook which, during the initial stage of the crash collapse only, is dragged off a small post 71 formed in the clamping channel 52. This causes the column steering wheel impact force to be increased for the start of the collapse, as required by the vehicle manufacturer, so that the airbag, located in the steering wheel hub, does not move significantly down the column axis due to the initial reaction caused by its explosive deployment.

The present construction described above with reference to FIGS. 6 to 9 is otherwise the same as that of FIGS. 1 to 5, and corresponding reference numerals have been applied to corresponding parts.

The two embodiments described above relate to steering column mechanisms for use with electrical power-assistance devices for a motor vehicle. Those devices provide steering wheel height adjustment, sometimes referred to as "Rake" adjustment only. However, more expensive and luxurious cars now require to include "double adjustment" of the steering wheel, that is to say adjustment of both Rake and tilt "Reach" where the latter refers to movement of the wheel along the column axis.

A "double adjustment" mechanism is illustrated in FIGS. 10 to 13 of the accompanying drawings.

In the particular vehicle for which the embodiments apply, the single-adjustment column of FIGS. 1 to 9 uses a conventional mechanical anti-theft key-lock 20 positioned on the right-hand side of the upper column tube 7, whereas the embodiment of FIGS. 10 to 13 uses an electric motor-driven key-lock 20*a* which, for reasons of knee clearance, is fixed to the guide portion 7 close to its connection to the EPS gearbox.

In the double adjustment mechanism illustrated in FIGS. 10 to 13 of the accompanying drawings a more complex method of crash energy absorption is required in order to ensure that the same collapse force—versus—collapsed distance characteristics is obtained for all the "Reach" position settings. However, the total collapse travel which is available in crash will still depend on the initial "Reach" position. In the embodiment illustrated the mechanism has a collapse travel of 65 mm, when set at mid-"Reach". Therefore if the "Reach" adjustment range is plus/minus 25 mm, then the available collapse travel can vary from a minimum of 40 mm to a maximum of 90 mm. However, the force-versus-treble characteristic for the initial 40 mm of travel, at least, must remain the same for all "Reach" settings. 40 mm is regarded as the minimum collapse travel which will afford the necessary driver protection.

The force characteristic can be tuned by varying the width and all the thickness and/or the load preformed curvature of a pair of deformable steel energy straps 80 which provide the crash energy absorption in this embodiment. Compared with the single-adjustment versions of FIGS. 1 to 5 and 6 to 9, the clamping channel 7 is enlarged in section so that it can accommodate an additional toothed channel 81 which is a slidable close fit inside it. This additional channel is provided with serrations 82 on the edges of its two flanges 83 and these serrations engage with the complementary serrations on a sintered toothed block 85 which is pulled into engagement by the inner end of the clamp spindle 23. Compared with the single-adjustment column, there is an additional "Reach" release spring 86 which ensures that these serrations 82, 84 fully engage when the clamp is released.

Figure 13:
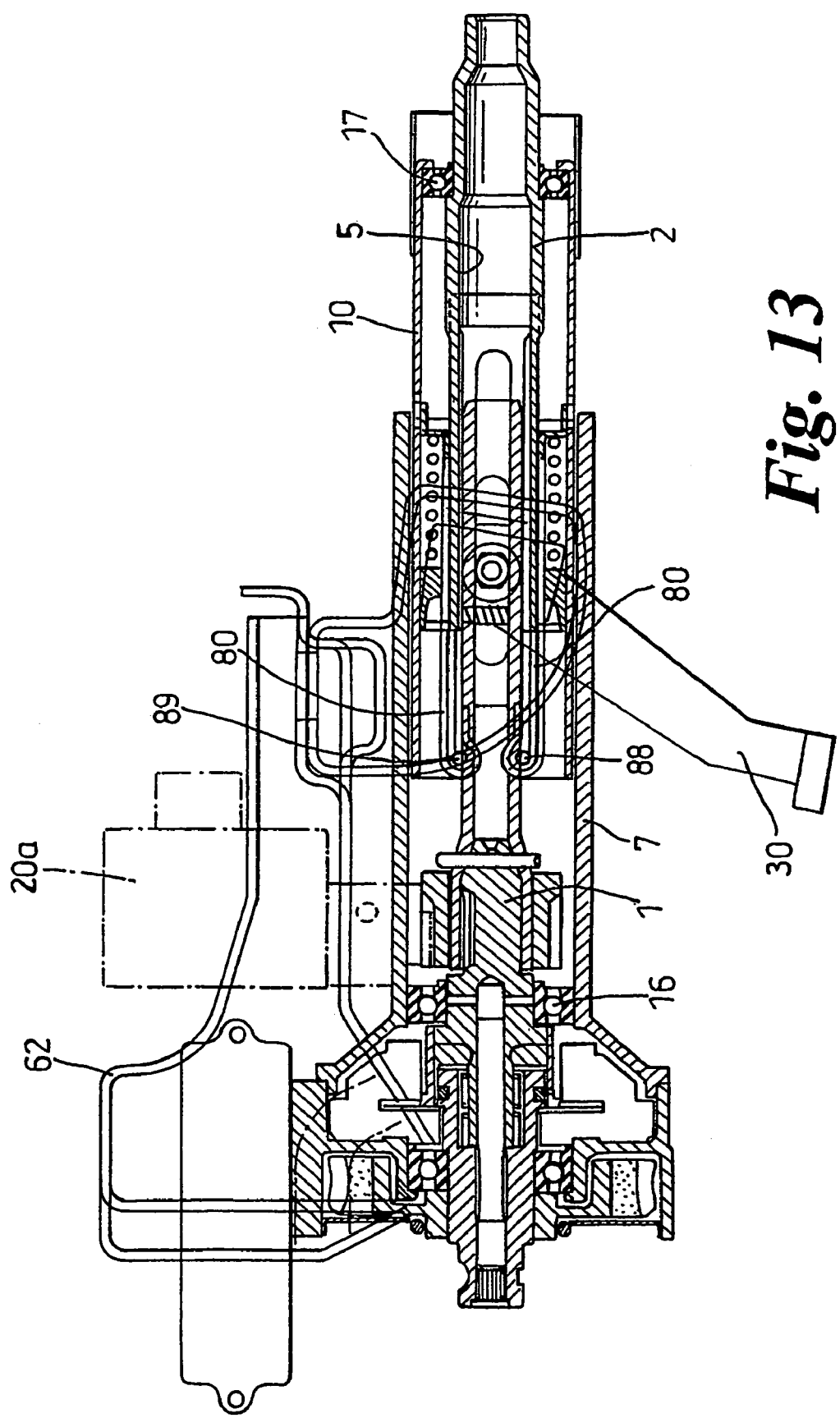
FIG. 13 is a longitudinal section similar to FIG. 12 but is spaced from it by 90°.

The length of the serrated portion of the tooth channel 81 is such that the tooth block 85 can engage with it in any position of "Reach" adjustment (FIG. 13). A slot 87 in the vertical wall of the tooth channel 81 allows for its movement in "Reach" adjustment relative to the clamped spindle 23. The tethered ends of the two energy straps 80 are welded to the inside faces of widened flanges 83 at the lower end of the two channels 81, namely the end which is furthest from the steering wheel 83.

The lower ends of the two flanges 83 of the clamping channels 7 are curled inwards to form anvils 88 over which the energy straps 80 are dragged during crash collapse (FIG. 13). Before fitting the welded assembly of toothed channel 81 plus energy straps 80 to the clamping channel 7, the energy straps 80 are substantially straight. Once assembled to the clamping channel 7, the end of each energy strap 80 is bent through 180° and formed tightly over its respective anvil 88 by a special tool which effectively locks the welded assembly rigidly to the clamping channel 7.

It follows therefore that during normal "Reach" adjustment the toothed channel 81 and the clamping channel 7 move together during crash collapse, the toothed channel 81 is unable to move because it is locked to the clamp spindle 23 by the toothed block 85. Hence, during crash collapse, the energy straps 80 are dragged around the anvils 88 of the clamping channels 7, which of course moves with the upper column tube, in order to accommodate the relative movement between he channels 7, 81. The collapse force characteristic is a function of the initial relative positions of the energy straps 80 and the clamping channel 7 and this remains the same for all "Reach" adjustment positions.

In a modification (not shown) small vertical hooks are formed in the free ends, namely the ends nearest the steering wheel, of the energy straps 80 which, during the above-mentioned "curling" operation in manufacture, come into engagement with corresponding transfer slots cut in the flanges of the clamping channel 7. The action of pulling these hooks out of the slots will provide an additional crash force at the start of the collapse in order to resist the reaction of the airbag deployment.

Figure 11:
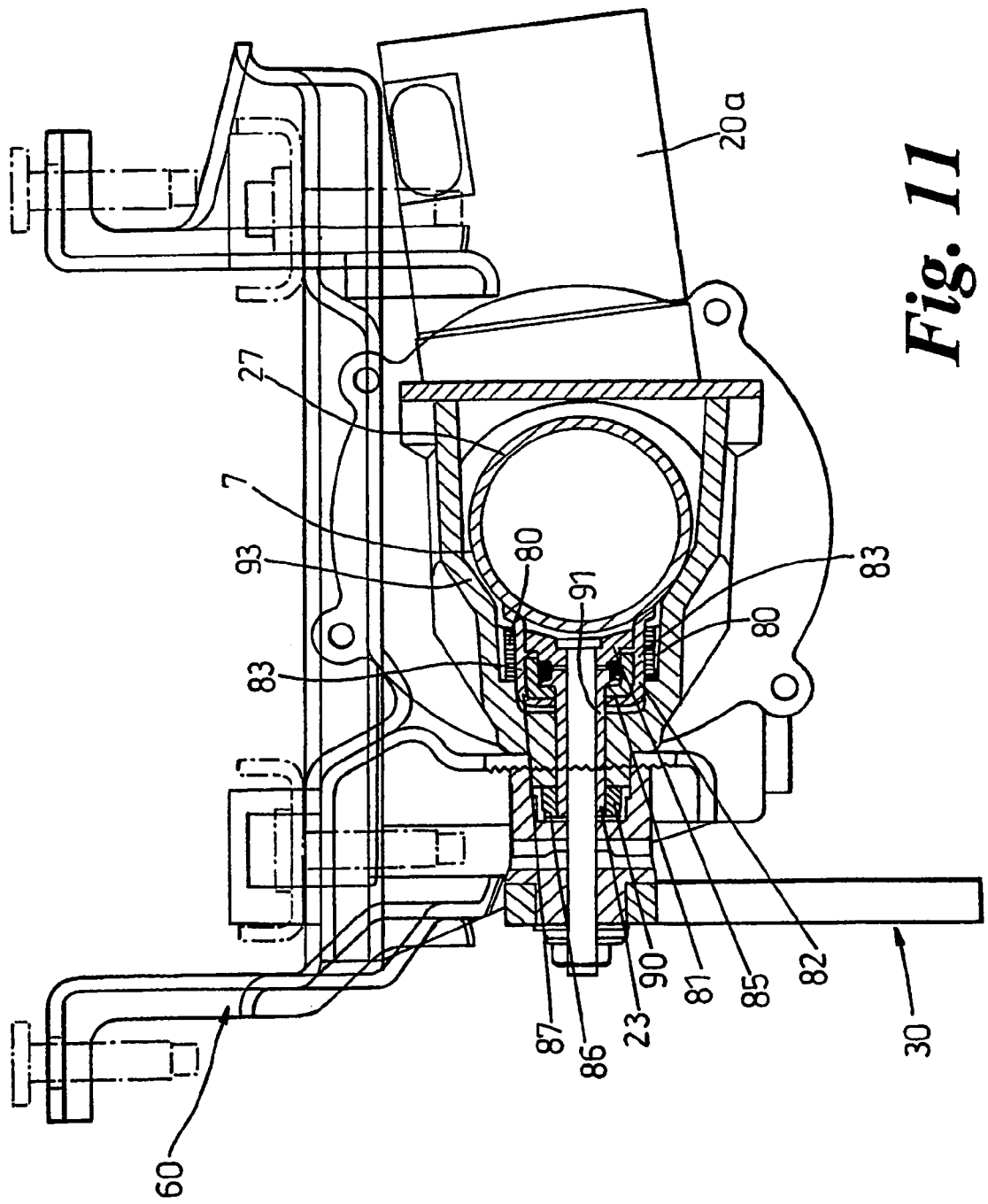
FIG. 11 is a transverse section through the assembly of FIG. 10.
Figure 12:
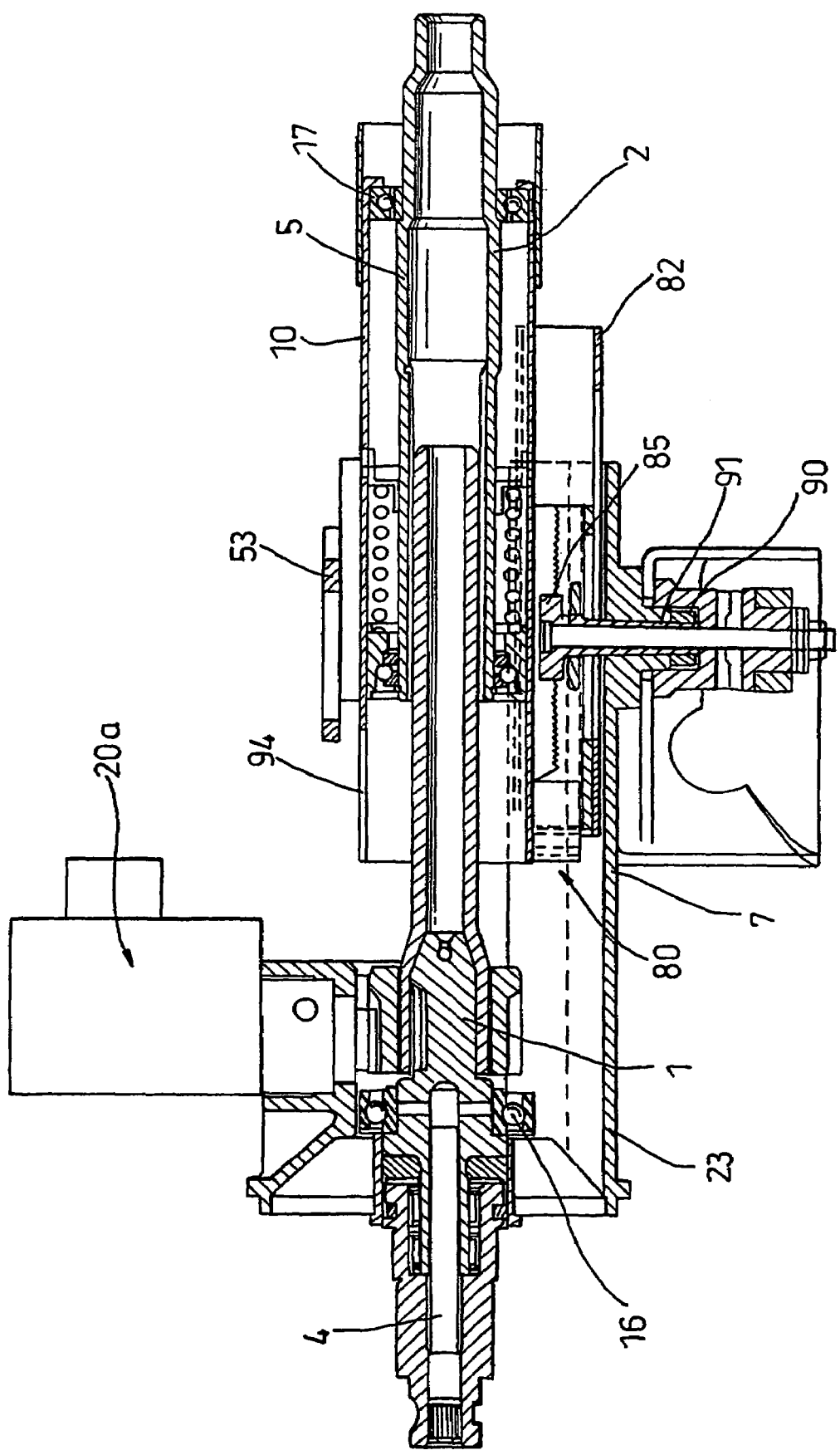
FIG. 12 is a longitudinal section through the assembly of FIG. 10.

On the double-adjustment column of the embodiment of FIGS. 10 to 13 there is a different method for adjusting the lateral pre-load remaining between the upper column tube and the guide post when the clamp is released. In this arrangement a free-play adjuster nut 90 engages with a hollow free-play adjuster bolt 91 which is co-axial with the clamp spindle 23 (FIG. 11). A rectangular adjuster bolt anti-rotation plate (FIG. 12) is welded to the head of the bolt 27 to prevent it from rotating. The nut 90 is treated with "Patchlok" so that its setting cannot change in service. Compared with the simple star washer 51 used in the single adjustment column of FIGS. 6 to 9 this method of pre-loaded adjustment gives the superior control of sliding the friction between the upper column tube and the guide post. This is required to arrive at and maintain acceptable "Reach" adjustment forces, which must be controlled within narrow limits defined by the specifications of the customers.

As an optional feature steel running strips 93 (FIG. 11) cover the machined arcs of the guide portion 7. These are clipped into cast slots and provide a smoother and lower wearing sliding action between the upper column tube and the guide post than would be the case with the steel tube bearing directly onto the aluminium guide post. The running strips are made from accurately thin and flexible shim steel so that the addition of them has only a small effect on the accuracy of alignment between the upper column tube and the guide post. These changes may be needed for the double-adjustment column because the sliding action can take place many thousands of times and must be quiet and must change significantly in feel over the life of the vehicle.

The upper column tube is completely circular. This allows it to pass the electric key-lock in crash.

In a modification the upper column tube may be provided with a longitudinal slot in its lower end which avoids a collision with the pawl of the electric key-lock in the unlikely event of the lock being engaged during the crash.

In another construction an external method is provided for controlling the amount of lateral free play between the upper column tube and guide portion while the clamp is released for column rake and reach adjustment. This may take the form of a plastic "slipper" moulding which is mounted from the guiding portion stiffener plate and which bears the onto right hand side of the upper column tube and is finely adjustable for running clearance from the tube via two or more stiff threaded screws.

In accordance with the provisions of the patent statutes, the principle and mode of operation of this invention have been explained and illustrated in its preferred embodiments. However, it must be understood that this invention may be practiced otherwise than as specifically explained and illustrated without departing from its spirit or scope.

What is claimed is:

1. A steering assembly for a vehicle comprising:
    a hollow lower guide portion;
    a hollow upper shroud portion, which fits at least partially within said guide portion and extends away from said guide portion;
    a telescopic steering staft having at least an upper part and a lower part, said upper part co-operating with said lower part and said upper and lower parts extending through said guide portion and said upper shroud portion;
    a lower axial bearing, and a seat first which supports said lower axial bearing in said guide portion and provides axial location for said lower steering shaft part;
    an upper axial bearing, and a second seat which supports said upper axial bearing in said upper shroud portion and provides axial location for said upper steering shaft part; and
    further in which said guide portion has at least one arcuate guide wall, which co-operates with a complimentary arcuate guide wall of the said upper shroud to define a contact surface along which said upper shroud portion is adapted to slide relative to said guide portion in the event of an accident.

2. The steering assembly of claim 1 wherein said guide wall of said guide portion defines at least one surface of constant radius, defining a segment of a first cylinder, whilst said guide wall of said upper shroud also defines at least one surface of constant radius, defining a segment of a second cylinder, with both walls having substantially the same radius.

3. The steering assembly of claim 2 wherein said guide walls have an axis of revolution which coincides with an axial center of said upper and lower bearing seats and is aligned with an axis of said steering shaft.

4. The steering assembly of claim 1 wherein said wall of said guide portion directly contacts said wall of said upper shroud portion.

5. The steering assembly of claim 1 wherein a shim is fitted between said hollow lower guide portions and said hollow upper guide portion and is trapped therebetween.

6. The steering assembly of claim 1 wherein said guide portion comprises a cast metal or plastic or composite component.

7. The steering assembly of claim 1 wherein said guide portion is formed as a drilled bore.

8. The steering assembly of claim 1 wherein said bearing seat for said lower bearing has a larger diameter than said arcuate guide wall.

9. The steering assembly of claim 1 wherein said guide portion comprises an elongate member having a generally c-shaped cross section along its length.

10. The steering assembly of claim 9 wherein a slot is provided in said internal wall of said guide portion opposite an open side of the cross-section.

11. The steering assembly of claim 9 wherein at least one pinch bolt is provided which connects one open side of said c-shaped guide to another, tightening of said bolt clamping together said sides of said guide onto pinch bolt posts provided around said bolts.

12. The steering assembly of claim 1 wherein said upper shroud comprises a tubular member with an external radius of said tube being the same as a radius of said arcuate wall of said guide portion.

13. The steering assembly of claim 1 wherein a further, intermediate, bearing is provided near to a lower end of said upper shroud portion.

14. The steering assembly of claim 1 wherein said two portions are supported by an alignment means which normally prevents relative axial movement of said two portions whilst permitting movement in the event of an accident.

15. The steering assembly of claim 14 wherein a spring is provided between said upper shroud and said upper part of the steering shaft acting via a bearing to support said upper part of said steering shaft relative to said lower part of said steering shaft.

16. The steering assembly of claim 1 wherein an energy-absorbing member is provided which connects said upper shroud portion to said guide portion, said member deforming as said upper shroud is moved further into said guide portion in the case of an accident.

17. The steering assembly of claim 16 wherein one of a width and a thickness of said strip varies along its length in order to control a rate of absorption of energy during collapse of said assembly.

18. The steering assembly of claim 1 wherein said lower part of said steering shaft is slidingly engaged with a bore in said upper part of said steering shaft.

19. The steering assembly of claim 18 wherein one or more splines on one of said lower part and said upper part co-operate with one or more slots in the other of said upper and lower parts to prevent relative rotation of said two parts.

20. The steering assembly of claim 1 wherein said assembly preferably comprises a part of an electric power assisted steering assembly.

21. The steering assembly of claim 20 wherein said guide portion includes one or more mounting portions for securing said guide portion to a housing of an electric motor such that said guide portion is rigidly secured to said motor housing.

* * * * *